3,804,777
METHOD FOR ACID REACTIVATING LEAD POISONED HYDROGENATION CATALYSTS
Roberto Canavesi, Bollate, and Giancarlo Aglietti and Benedetto Calcagno, Milan, Italy, assignors to Società Italiana Resine S.p.A., Milan, Italy
No Drawing. Filed July 22, 1971, Ser. No. 165,388
Claims priority, application Italy, July 23, 1970, 27,785/70
Int. Cl. B01j *11/18*
U.S. Cl. 252—413
2 Claims

ABSTRACT OF THE DISCLOSURE

Hydrogenation catalysts poisoned by lead, particularly palladium alumina catalysts, are regenerated with dilute nitric or orthophosphoric acid at ambient or slightly raised temperatures.

---

The present invention relates to hydrogenation catalysts of rare metals supported on a base more particularly it relates to the regeneration of such catalysts which have been rendered inactive following their use in hydrogenation processes, particularly in respect of pyrolytic benzines.

According to a known refinery method, the hydrocarbon fraction known as "virgin naphtha" is subjected to pyrolysis treatment in the presence of vapor, producing a liquid fraction which is rich in aromatic hydrocarbons, and a gaseous fraction.

The liquid fraction, known as pyrolytic benzine, is subjected to catalytic hydrogenation treatments in order to eliminate the unsaturated hydrocarbons (olefines and dienes) and compounds containing sulphur and nitrogen.

Such treatments are normally carried out in two hydrogenative stages, more precisely using a "first stage hydrogenation" intended essentially to convert the dienes into mono-olefines, followed by a "second stage hydrogenation" designed to hydrogenate the olefines and eliminate the compounds containing sulphur and nitrogen.

More particularly in the "first stage hydrogenation," the process is carried out under the pressure of hydrogen or gases containing molecular hydrogen, under mild temperature conditions and in the presence of rare metal based catalysts.

In such a process, phenomena of deactivation are often encountered, the life of the hydrogenation catalyst having been foreshortened. The causes of such deactivation may vary, being for example the deposition of organic substances and particularly substances with a high molecular weight which form as the result of polymerization of the unsaturated compounds contained in the hydrocarbon mixture.

As is well-known, such deposits are eliminated from catalysts which have been so deactivated by combustion of the organic substances. However, there is another form of catalyst deactivation in the "first stage hydrogenation" of pyrolytic benzines, which consists in the deposition of lead on the catalytic metal.

Apart from a certain lead content in the benzines, the presence of such a metal in the benzines may be increased by various causes such as for example when the "virgin naphtha" or the pyrolytic benzine is conveyed through pipes or stored in tanks which have been previously used for benzines which contain lead compounds.

Alternatively, contamination may be due to corrosive phenomena or originate from those lead compounds such as naphthenates which are used as valve lubricants.

It should be noted that a very low lead deposit equal to approx. 0.06% of catalytic metal is sufficient to render the catalyst virtually useless.

Thus, allowing for the fact that the catalyst contains the catalytic metal in quantities normally equal to approx. 0.2% by weight, a hydrocarbon charge containing 1 p.p.m. lead renders the catalyst inactive in a period of time equal to approx. 200 hours under the conditions in which "first stage hydrogenation" is carried out. Thus, a need has been felt for a process which makes it possible to regenerate the catalysts described by eliminating the deposited lead, restoring to them at the same time the characteristic features of activity and selectivity in the hydrogenation processes.

One object of the present invention is therefore a process for the elimination of the lead deposits from rare metal based catalysts which have been deactivated following their use in hydrogenation, particularly the "first stage hydrogenation" of pyrolytic benzines.

Another object of the present invention is a process for rendering rare metal based catalysts which have been deactivated in hydrogenation processes active and selective.

A further object of the invention is to provide a simple and economically suitable process of regenerating such catalysts.

Further objects of the invention will become apparent from the ensuing description.

In the course of the present description, the term hydrogenation catalysts will be understood as referring to those catalysts which are constituted by a rare metal, and in particular by a metal of the eighth group of the periodic system of elements, on a base such as for example alumina or those products known as decolorizing earths such as diatomaceous, fuller's earths of kieselguhr, such catalysts containing the rare metal in quantities ranging from 0.1 to 2.0% by weight.

Such hydrogenation catalysts, deactivated following deposition of lead are, according to the present invention, treated by a dilute aqueous solution of nitric acid or orthophosphoric acid, working at low temperatures, such treatment being carried out with the acid solution preferably flowing continuously through the particles of spent catalyst.

More particularly according to the method of the present invention, nitric acid or orthophosphoric acid is used in aqueous form the acid concentration not exceeding 1 N and preferably not exceeding 0.01 to 0.5 N. Furthermore, treatment is carried out at a temperature equal to or less than 50° C. and preferably 15 to 30° C.

In the preferred form, the acid solution is percolated continuously through the catalyst granules at a maximum rate of 4 parts by volume of solution per part of catalyst (by volume) per hour and for periods of 4 to 9 hours or more.

Preferably, the rate at which the acid solution is supplied is maintained at 1 to 3 parts by volume per part of catalyst (by volume) per hour.

The treatment of the spent catalyst can also be carried out intermittently, the catalyst being brought into contact with successive portions of the acid solution.

In this case, total quantities of acid solution of 8 to 20 and preferably 10 to 15 parts by volume per part by volume of catalyst are used, the previously defined range of temperatures still being applied.

By proceeding in this way, hydrogenation catalysts are obtained which are virtually bereft of lead and which have activity and selectivity properties, in the processes of hydrogenation of pyrolytic benzines, virtually equal to those of the fresh catalyst.

It should be noted that it is not possible significantly to vary the conditions imposed for treatment of the spent catalysts without detriment to the result.

Thus, for example, in continuous treatment, working at acid solution feed rates in excess of 4 parts by volume per part by volume of catalyst per hour, regenerated catalysts are obtained which are less active than the fresh catalysts. Similar results are obtained in the continuous and discontinuous processes with solutions having an acid content in excess of 1 N.

It is felt that, by proceeding under these conditions, the acid treatment affects both the catalytic metal and/or the base with consequent undesirable results.

Moreover, when working with concentrations of acid solutions and for periods of time which are less than those described, catalysts having the degree of activity preferable in hydrogenation processes are not obtained.

In the event of organic materials, besides the lead, being deposited on the hydrogenation catalyst, it is worthwhile subjecting such organic materials to combustion and then treating with the acid aqueous solutions in the manner described.

Finally, the catalysts are treated with hydrogen at temperatures of the order of 100° C., for periods of 1 to 3 hours, preferably working under ambient pressure conditions.

The method of the present invention is particularly applicable to those alumina-based palladium catalysts which contain from 0.1 to 2.0% by weight of the catalytic metal.

These catalysts, in the form of granules of a size ranging from 2 to 5 mm. approx. are normally used industrially in the "first stage hydrogenation" of pyrolytic benzines. The method of the present invention essentially offers the advantage of simplicity and economy.

In addition, it makes it possible to obtain catalysts with a high degree of activity and selectivity from catalysts which have been contaminated by lead following their use in hydrogenation processes, particularly in the "first stage hydrogenation" of pyrolytic benzines.

EXAMPLE 1

A pyrolytic benzine with a boiling range of 49 to 175° C. and having a maleic anhyride number equal to 70 and a bromine number equal to 56 is introduced through the top into a tubular reactor containing 100 ml. of catalyst consisting of alumina-based palladium, with a quantity of palladium equal to 0.2% by weight and in the form of granules of 2 mm. in size.

This benzine also contains 1 p.p.m. of lead.

Hydrogen in a quantity equal to 200 N liters per liter of benzine is also applied to the reactor.

Hydrogenation is carried out at a pressure equal to 40 kg./sq. cm., the inlet temperature of the substances being equal to 40° C. and the benzine being supplied at the rate of 6 parts per part of catalyst per hour.

In particular, the benzine supplied comprises one-third non-hydrogenated product having the previously described characteristics while the remaining two-third is recycled hydrogenated benzine.

Working under these conditions, after 100 hours, the maximum hydrogenation temperature drops from 65° to 50° C. and the product discharged has a maleic anhydride number equal to 6.7. It should be noted that the maximum value acceptable for this property is 3.

After this period of time the catalyst contains 160 p.p.m. lead uniformly distributed throughout it.

EXAMPLE 2

The catalyst which has been deactivated following the hydrogenation described in the first example is placed in a glass column and treated with a 0.06 N aqueous solution of nitric acid. The acid aqueous solution is supplied at the top of the column at the rate of 2 parts by volume per part by volume of catalyst per hour, the column being maintained filled with liquid at all times.

The process is carried out at ambient temperature and pressure, the treatment being continued for 9 hours. At the end of this period, the lead is virtually eliminated from the catalyst while the palladium content remains unchanged.

The catalyst which has been thus regenerated is used in the hydrogenation of pyrolytic benzine having the characteristic features described in the first example and containing no lead.

The conditions of hydrogenation are those described in the first example.

Hydrogenation is continued for 1000 hours approx. and during this period the maleic anhydride number of the hydrogenated benzine remains constant at around 0.2.

EXAMPLE 3

A catalyst spent after being used in an industrial plant in the "first stage hydrogenation" of pyrolytic benzines is subjected to regeneration.

The catalyst, in the form of granules of 2 mm. dimensions, consists of alumina, used as a base, and contains 0.2% by weight of metallic palladium.

The spent catalyst also contains 500 p.p.m. of lead and organic substances deposited on the surfaces. After combustion to eliminate the organic substances, the catalyst is still inactive in processes for the hydrogenation of pyrolytic benzines. It is then made to undergo a treatment with an aqueous solution of nitric acid.

More precisely, the catalyst is introduced into a column, from the top of which aqueous nitric acid with a titre of 0.1 N is percolated at a supply rate of 1 part by volume of solution per part by volume of catalyst and per hour.

The treatment is continued for 9 hours at ambient temperature and pressure.

The catalyst is then placed in the hydrogenation reactor and hydrogen supplied in quantities equal to 400 parts by volume per part by volume of catalyst and per hour, for a total period of 2 hours, working at ambient pressure and at a temperature of approx. 100° C.

Pyrolytic benzine having the characteristics features described in the first example and containing no lead compounds is then fed to the reactor.

Hydrogenation has been carried out using the methods described in the first example for 1500 hours and during this period the maleic anhydride number of the hydrogenated product has been maintained at around 0.2.

We claim:

1. A process for regenerating a lead poisoned hydrogenation catalyst consisting essentially of 0.1 to 2.0 percent by weight palladium supported on alumina, said catalyst having been poisoned by deposition thereon of lead as a result of the use of said catalyst in the first-state hydrogenation of pyrolytic benzine, said process consisting essentially of:

(1) continuously contacting the poisoned catalyst in a column by percolating therethrough a dilute aqueous solution of nitric acid having a concentration of from 0.01 to 0.5 N for a period of time of from 4 to 9 hours and at a temperature of from 15 to 30° C. and at a contacting rate of from 1 to 3 volumes of said solution per volume of catalyst per hour; and (2) treating the catalyst from step (1) with hydrogen at a temperature of about 100° C. for a period of time from 1 to 3 hours at atmospheric pressure, thereby substantially completely removing the lead poison from said catalyst without altering the palladium content substantially and without substantially decreasing the selectivity and activity of said catalyst.

2. The process of claim 1 further consisting essentially of, prior to said step (1), subjecting the poisoned catalyst to a combustion step to remove any organic materials deposited on said poisoned catalyst during said first-stage hydrogenation of pyrolytic benzenes.

References Cited

UNITED STATES PATENTS

| | | | |
|---|---|---|---|
| 2,704,281 | 3/1955 | Appell | 252—413 |
| 2,867,497 | 1/1959 | Houdry et al. | 252—413 |
| 3,112,277 | 11/1963 | Michalko | 252—413 |
| 2,849,406 | 8/1958 | Lane | 252—413 |
| 3,288,704 | 11/1966 | O'Hara et al. | 208—143 |
| 3,089,844 | 5/1963 | Thorn et al. | 252—413 |
| 3,451,922 | 6/1969 | Parker | 260—677 H |

FOREIGN PATENTS

| | | | |
|---|---|---|---|
| 71,101 | 5/1970 | East Germany | 252—415 |

DANIEL E. WYMAN, Primary Examiner

P. E. KONOPKA, Assistant Examiner